United States Patent [19]

Moorhead

[11] Patent Number: 5,038,515
[45] Date of Patent: Aug. 13, 1991

[54] CONTAINER FOR FISH AND FISH RECEIVING DEVICE

[76] Inventor: Jack B. Moorhead, 822 Hedwig Way, Houston, Tex. 77024

[21] Appl. No.: 436,354

[22] Filed: Nov. 14, 1989

[51] Int. Cl.⁵ ............................................. A01K 97/00
[52] U.S. Cl. .......................................... 43/55; 43/56
[58] Field of Search ....................... 43/55, 56; 224/920, 224/921; 206/315.11

[56] References Cited

U.S. PATENT DOCUMENTS

| | | | |
|---|---|---|---|
| 594,448 | 11/1897 | Webber | 43/55 |
| 1,983,139 | 12/1934 | Lovell | 43/55 |
| 2,016,488 | 10/1935 | Eckhaus | 43/56 |
| 2,097,186 | 10/1937 | Hinnenkamp | 43/56 |
| 2,651,137 | 9/1953 | Sweet | 43/56 |
| 2,693,661 | 11/1954 | Piker | 43/56 |
| 2,717,469 | 9/1955 | Piker | 43/56 |
| 2,740,546 | 4/1956 | Kowalski | 43/56 |
| 3,025,629 | 3/1962 | Sears | 43/55 |
| 3,315,402 | 4/1967 | Scott | 43/55 |
| 3,559,329 | 2/1971 | Chiu | 43/55 |
| 4,008,540 | 2/1977 | Brower | 43/55 |
| 4,070,786 | 1/1978 | Dunham | 43/55 |
| 4,870,778 | 10/1989 | Sheppard | 43/55 |

*Primary Examiner*—Kurt Rowan
*Attorney, Agent, or Firm*—Guy McClung

[57] ABSTRACT

A container for fish and a fish receiving device for use with containers or with receptacles for fish. In one embodiment a container is an insulating container for receiving and maintaining fish in a fresh condition, the container having exteriopr walls and one wall or top movably connected to one of the other walls for opening the container and a fish receiving device mounted to one of the walls or to the top, the fish receiving device including a flexible member such as, but not limited to, a piece of fabric into and through which a fish can be inserted into the container. A fish receiving device which in one embodiment includes a frame member to which is mounted a flexible member such as, but not limited to, a piece of fabric into and through which a fish can be inserted.

3 Claims, 2 Drawing Sheets

CONTAINER FOR FISH AND FISH RECEIVING DEVICE

FIELD OF THE INVENTION

This invention is related to: containers and ice chests having apparatus into and through which live fish can be inserted without opening the container or ice chest; and to the apparatus itself.

BACKGROUND OF THE INVENTION

In many types of sport fishing, such as fishing from boats and piers, and fishing on a bank or shore, anglers have a container or ice chest nearby for keeping recently-caught fish. When a fish is caught, the container is opened; with ice chests the fish is placed on ice in the ice chest.

Keeping the fish on ice serves a number of purposes such as maintaining the freshness, and sometimes taste, of the fish, as well as keeping the fish meat at a consistency that facilitates cleaning and filleting. It is very convenient to keep a fish in this way without having to clean the fish immediately, particularly when the fishing gets "hot" and the angler is catching many fish in a short time period.

Several problems are related to the prior art method of placing fish in a container or in an ice chest. Initially, while holding a rod and reel in one hand and a fish in the other, an angler must either set the rod down or try to open the container while holding the rod. In a crowded boat this can require great dexterity, particularly with a wiggling live fish of any size. Once an ice chest is open, and each time it is open, ice therein is subjected to warm air. Consequently, the ice melts more quickly than it would if the chest remained closed.

There has long been a need for a container into which a live fish can be quickly and efficiently inserted. There has long been a need for an ice chest for keeping fish in which ice therein is subjected to a minimum of hot air outside the chest.

SUMMARY OF THE INVENTION

The present invention is directed to: a container or ice chest for receiving and keeping fish; and to an apparatus for receiving fish and through which fish can be inserted which is useful with containers or ice chests for fish. In one embodiment a container according to this invention has a box member with a bottom wall and four side walls and a lid wall member hingedly connected to the box member. In one of the walls, for example in the lid wall, there is a fish receiving device mounted over a hole in the wall. In one embodiment the fish receiving device includes pieces of fabric mounted over the hole to cover the hole with edges of the fabric meeting over the hole so that there is an opening between the two fabric pieces over the hole through which a fish can easily be inserted into the container. In other embodiments the two fabric pieces can be positioned so that one overlaps the other slightly without impeding the insertion of a fish into the chest. In other embodiments a separate door, lid, flap, or piece of fabric can be movably connected to the chest wall adjacent the fish receiving device to provide a cover over the opening between fabric pieces. It can be hingedly connected to the wall or it can be slidingly mounted in the wall. In other embodiments a single fabric piece with a slit in it can be used rather than multiple pieces or a plurality of interleaved or overlapping pieces can be employed to cover the hole in the chest. In other embodiments the fish receiving device can be in the lid wall or in a side wall. In other embodiments the container can be of a variety of shapes with a fish receiving device as previously described; for example the container can be of any particular shape suitable for holding fish, including but not limited to spherical or cylindrical, and the fish receiving device can be located anywhere on the container where it is accessible by an angler. Although the size of the container or ice chest is not limited by this invention, in one particular embodiment a container is provided which is small enough to be carried by an angler, e.g., on a strap over the angler's shoulder or on a belt around an angler's waist. Also, in one embodiment of this invention there is a container for fish with any of the previously described fish receiving devices, but which container is not necessarily an ice chest or an insulated container. In another embodiment of this invention a fish receiving device is provided which has a frame and an opening member mounted to the frame through which a fish can be inserted, the fish receiving device suitable for incorporation on a container or ice chest.

The present invention solves the problems with prior art ice chests and containers described above. The present invention recognizes, addresses and satisfies the long-felt needs described above.

It is, therefore, an object of the present invention to provide a novel, unique, useful, efficient and non-obvious container for receiving and keeping fish.

It is also an object of this invention to provide a new, useful, unique, efficient and non-obvious fish receiving device through which a fish can be easily inserted into a container with which the fish receiving device can be used.

Objects of at least preferred embodiments of this invention include the following:

- a container for receiving and keeping fish, the container having a fish receiving device in one of its walls, preferably a top wall or area easily accessible by an angler, the device having an opening over or mounted in a hole in the container so that a fish can be inserted through the device and through the hole in the container into the container,
- such containers in which the fish receiving device includes a single slit piece of material or fabric or pieces of material or fabric mounted with edges meeting over the hole,
- such a container in which some or all of the container is insulated,
- such a container in which a cover member is provided on the container above the fish receiving device or at least some or all of the area in which fabric edges meet,
- a fish receiving device for mounting in or over a hole in an apparatus for receiving fish or in or over a hole in a container for keeping fish, including but not limited to a container in which some or all of the container is insulated,
- such a device in which a piece of material or fabric is slit to permit fish to pass through or multiple pieces of material or fabric are mounted so that either their edges meet at a point over the hole and a fish can be inserted between the edges or the fabric or material pieces are interleaved or overlapped and are movable to permit a fish to be inserted therethrough, such a device including a door or cover movably mounted above the opening or point through which a fish is inserted.

The present invention recognizes and addresses the previously-mentioned unaddressed long-felt needs and provides a satisfactory meeting of those needs in its various embodiments. To one of skill in this art who has the benefits of this invention's teachings and disclosures, other and further objects and advantages will be clear, as well as others inherent therein, from the following description of presently-preferred embodiments, given for the purpose of disclosure, when taken in conjunction with the accompanying drawings. Although these descriptions are detailed to insure adequacy and aid understanding, this is not intended to prejudice that purpose of a patent which is to claim an invention no matter how others may later disguise it by variations in form or additions or further improvements.

DESCRIPTION OF THE DRAWINGS

So that the manner in which the above-recited features, advantages and objects of the invention, as well as others which will become clear, are attained and can be understood in detail, more particular description of the invention briefly summarized above may be had by reference to certain embodiments thereof which are illustrated in the appended drawings, which drawings form a part of this specification. It is to be noted, however, that the appended drawings illustrate preferred embodiments of the invention and are therefore not to be considered limiting of its scope, for the invention may admit to other equally effective equivalent embodiments.

DESCRIPTION OF THE PREFERRED EMBODIMENTS

Figure 1:
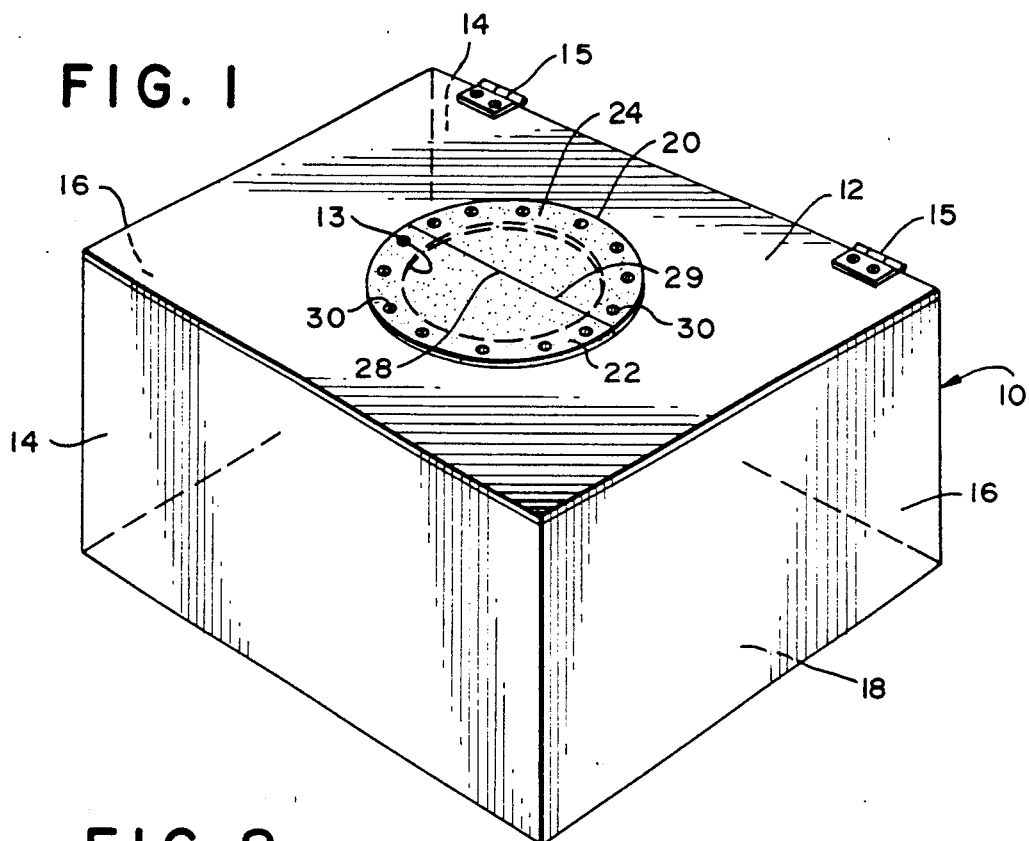
FIG. 1 is a perspective view of a container according to the present invention.

As shown in FIG. 1 a container 10 according to the present invention has a receptacle for fish formed by connected walls including side walls 14 and 16, bottom wall 18, and a top wall which serves as a movable lid 12, the lid 12 movably secured to the side wall 14 by hinges 15 for opening and closing the container 10.

Over a hole 13 in the lid 12 is mounted a fish receiving device 20 which has two pieces of fabric or flexible material fastened to the lid 12 by fasteners 30 such as staples or screws. In one preferred embodiment, the fabric used is rubberized fabric out from an exercise belt to a desired size and it is secured to the lid with elongated metal strips (not shown) through which screws are placed and then secured into the lid. Although a space could be left between the fabric pieces, it is preferred that the edges 28 and 29 of the fabric pieces 22 and 24 respectively meet over the hole 13. Due to the flexibility of the fabric, when a fish is inserted at the point where the edges 28, 29 meet, the fish can easily pass between the fabric pieces and into the container 10. The device 20 also prevents fish from escaping through the hole 13.

The hole 13 can be sized as desired and it can be placed on the lid 12 or in one of the side walls so that it is easily accessible by a person with a fish to be placed in the container. Some or all of the container's walls and lid can be insulated. The container can be an ice chest such as many anglers use for receiving and keeping fish until they can be sized as desired and shaped as desired.

Figure 2:
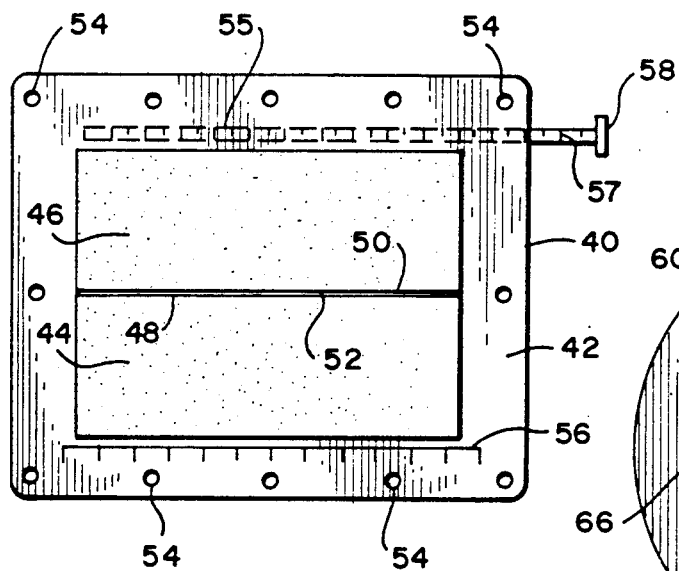
FIG. 2 is a top plan view of a fish receiving device according to the present invention.

As shown in FIG. 2, a fish receiving device 40 according to the present invention has a rectangular frame 42 to which are secured, e.g. by adhesives or fasteners, two pieces of fabric 44 and 46 which have edges 48 and 50, respectively, which meet along a line 52. A plurality of holes 54 are provided in the frame 42 for facilitating the mounting of the device 40 over a hole in a fish keeping container or a fish transmitting apparatus. A fish can be inserted through the device 40 between the flexible fabric pieces.

Figure 3:
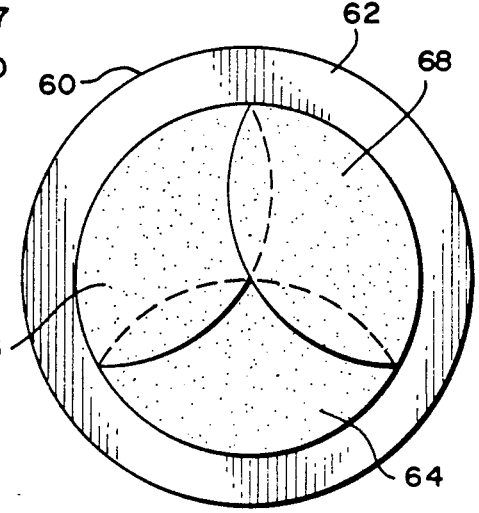
FIG. 3 is a top plan view of a fish receiving device according to the present invention.

As shown in FIG. 3, a fish receiving device 60 has a circular frame 62 to which are secured three overlapping, interleaved fabric pieces 64, 66, and 68. The device 60 can be mounted over or in a hole in a container for fish or a fish transmitting apparatus. Due to the flexibility of the fabric pieces 64, 66, 68 and their disposition about the frame 62, a fish can be inserted easily through the device 60.

FIGS. 4a through 4d illustrate various embodiments of fish receiving devices according to the present invention which when incorporated in a container produce a container for fish according to the present invention. A fish receiving device 70 has two pieces of fabric or flexible material 71, 72 each of which is secured to a wall 73 or a container (not shown entirely) over a hole 74. The pieces of fabric 71 meet along a line 75 and a piece of fabric 76 secured to the piece of fabric 71 by stitching 77 partially covers the fabric pieces 71, 72 including the line 75 along which they meet. The piece of fabric 76 can be moved upwardly or it can be pushed inwardly, e.g. by a fish inserted into the hole 74.

Figure 4A:
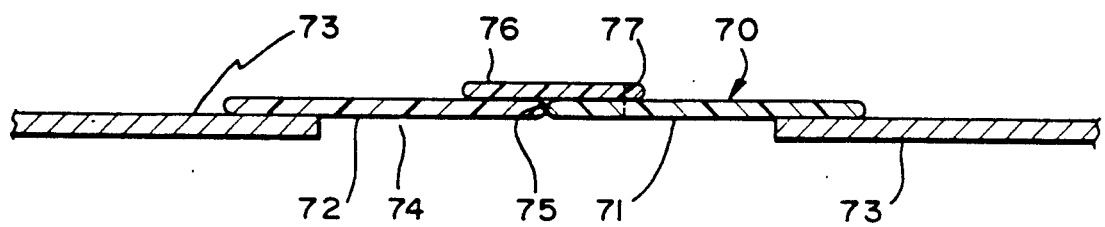
FIGS. 4a-4d are side crosssectional views of fish receiving devices according to the present invention useful with containers according to the present invention.
Figure 4B:
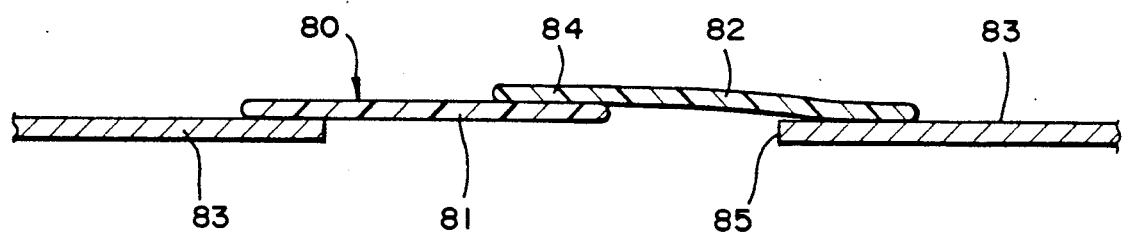
Figure 4C:
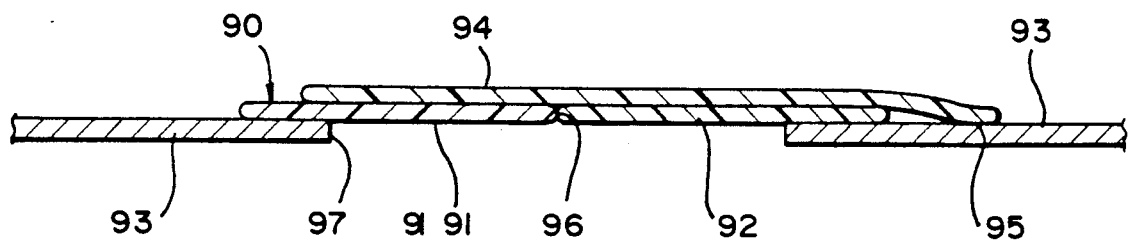

As shown in FIG. 4b a fish receiving device 80 has two pieces of fabric 81, 82 secured to a lid 83 of a container (not shown entirely). A portion 84 of fabric piece 82 overlaps fabric piece 81. As shown in FIG. 4c a fish receiving device 90 has two pieces of fabric 91, 92 secured to a lid 93 of a container, the container having a hole 85 for inserting fish into the container (not entirely shown) which has a hole 97 for receiving fish and a third piece of flexible fabric 94 is movably secured to the lid 93 at point 95 such as by a fastener or by an adhesive. The fabric piece 94 overlaps the area 96 where the fabric pieces 91, 92 meet. Of course, piece 94 could be extended to cover the entire area above the hole 97.

Figure 4D:
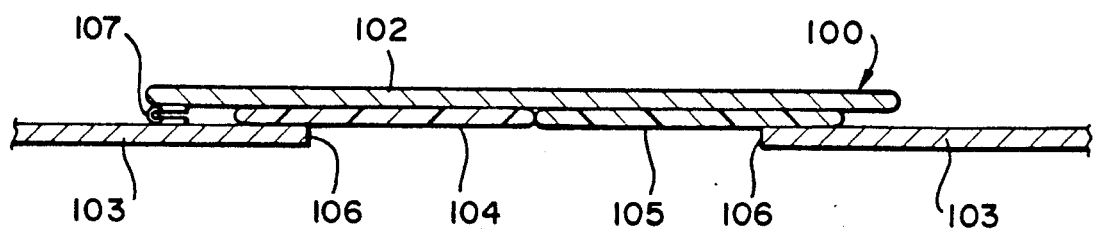

FIG. 4d shows a fish receiving device 100 like that of FIG. 1 (device 20) with the addition of a solid cover 102 hingedly connected with a hinge 107 to a lid 103 of a container (not entirely shown). The cover 102 covers two pieces of fabric 104, 105 (which function like the fabric pieces 22, 24 of the device 20) which are secured to the lid 103 over a hole 106. By eliminating the hinge 107 a providing a suitable space within the lid 103, the cover 102 can be converted into a sliding-door-type cover (not shown).

Each of the devices shown in FIGS. 4a-4d facilitate the insertion of a fish into a container and prevent a fish from jumping out through a hole in the container over or in which the device is mounted. When the container is an insulated container, e.g. an ice chest, the various overlapping fabric pieces or covers enhance the insulative effect of the devices by covering the points or line along which fabric pieces meet and providing a second cover for some or all of the hole in the container.

In conclusion, therefore, it is seen that the present invention and the embodiments disclosed herein are well adapted to carry out the objectives and obtain the ends set forth at the outset. Certain changes can be made in the method and apparatus without departing from the spirit and the scope of this invention. It is realized that changes are possible and it is further intended that each element recited in any of the following claims is to be understood as referring to all equivalent elements for accomplishing substantially the same results in substantially the same or equivalent manner. It is intended to cover the invention broadly in whatever form its principles may be utilized. The present invention is, therefore, well adapted to carry out the objects and obtain the ends and advantages mentioned, as well as others inherent therein.

As shown in FIG. 2 a scale 56 can be included on the frame 42 for measuring a fish. Also an extensible member 58 with a scale 57 thereon can be movably disposed between the underside of the frame 42 and the surface of a container on which is mounted the device 40. The member 58 can be moved outwardly to accommodate a fish and it may be used in conjunction with a scale 55 on the frame 42; or the member 58 may be used alone. The use of thicker and/or rubberized or treated fabric adds to the insulative effect of the fabric.

I claim:
1. A fish receiving device for mounting over a hole in a container for keeping fish, the fish insertable through the hole into the container, the fish receiving device comprising
   a frame member mountable over the hold,
   a flexible member mounted to the frame member,
   the flexible member having opening means therein into which and through which a fish is insertable into the container through the hole,
   the flexible member including two pieces of flexible fabric secured to the frame each with an edge meeting an edge of the other piece over the hole to form an opening means along and between the edges, and
   a cover secured to one of the two pieces of flexible fabric or to the frame and at least partially covering each piece of fabric and the area along which their edges meet.
2. The fish receiving device of claim 1 wherein the cover itself is a piece of flexible fabric.
3. The fish receiving device of claim 1 including also a fish measuring scale on the frame and an extensible scale member with a fish measuring scale thereon, the extensible member movably disposed between the frame member and the container so that it can be extended and then used in conjunction with the fish measuring scale to accommodate a fish.

* * * * *